US009260094B2

(12) United States Patent
Yuasa et al.

(10) Patent No.: US 9,260,094 B2
(45) Date of Patent: Feb. 16, 2016

(54) VEHICLE BRAKE DEVICE (71) Applicant: ADVICS CO., LTD., Kariya (JP)

(72) Inventors: Kentaro Yuasa, Tokai (JP); Masatoshi Hanzawa, Kariya (JP)

(73) Assignee: ADVICS CO., LTD., Kariya, Aichi-Pref (JP)

( * ) Notice: Subject to any disclaimer, the term of this patent is extended or adjusted under 35 U.S.C. 154(b) by 0 days.

(21) Appl. No.: 14/402,137

(22) PCT Filed: May 28, 2013

(86) PCT No.: PCT/JP2013/064728
§ 371 (c)(1),
(2) Date: Nov. 19, 2014

(87) PCT Pub. No.: WO2013/180107
PCT Pub. Date: Dec. 5, 2013

(65) Prior Publication Data
US 2015/0145321 A1 May 28, 2015

(30) Foreign Application Priority Data

May 28, 2012 (JP) ................. 2012-120951

(51) Int. Cl.
*B60T 8/17* (2006.01)
*B60T 13/66* (2006.01)
(Continued)

(52) U.S. Cl.
CPC . *B60T 8/17* (2013.01); *B60T 8/172* (2013.01); *B60T 13/662* (2013.01); *B60T 13/741* (2013.01); *B60T 17/221* (2013.01); *B60T 2270/402* (2013.01)

(58) Field of Classification Search
CPC .......... B60T 8/17; B60T 8/172; B60T 13/662; B60T 13/741; B60T 17/221; B60T 2270/402
See application file for complete search history.

(56) References Cited

U.S. PATENT DOCUMENTS

| 7,744,166 B2 | 6/2010 | Leiter et al. |
| 2006/0267402 A1 | 11/2006 | Leiter et al. |

(Continued)

FOREIGN PATENT DOCUMENTS

| JP | 8-2402 A | 1/1996 |
| JP | 2007-519568 A | 7/2007 |

(Continued)

OTHER PUBLICATIONS

International Search Report (PCT/ISA/210) mailed on Jul. 2, 2013, by the Japanese Patent Office as the International Searching Authority for International Application No. PCT/JP2013/064728.

*Primary Examiner* — Vishal Sahni
(74) *Attorney, Agent, or Firm* — Buchanan Ingersoll & Rooney PC (57) ABSTRACT

An electronic control device for controlling operations of an electric parking brake and a service brake: determines a release impossible state in which release operation cannot be performed, based on a fact that a motor current that is supplied to an electric motor of the electric parking brake during release control is maintained in a state of a locked rotor current; and performs, when the release impossible state is determined, back-up pressurization for pressing the piston by generating a brake fluid pressure in the wheel cylinder using the service brake and for pressing the friction-applying member against the friction-applied member.

5 Claims, 8 Drawing Sheets (51) Int. Cl.
*B60T 13/74* (2006.01)
*B60T 17/22* (2006.01)
*B60T 8/172* (2006.01)

(56) References Cited

U.S. PATENT DOCUMENTS

2011/0278108 A1* 11/2011 Watanabe ............... B60T 7/042
 188/72.3
2013/0116904 A1  5/2013 Watanabe et al.

2014/0015310 A1* 1/2014 Hanzawa .................. B60T 7/12
 303/3
2014/0188362 A1* 7/2014 Kotake .................. B60T 13/741
 701/70

FOREIGN PATENT DOCUMENTS

JP    2007-245996 A    9/2007
WO   WO 2011/158855 A1   12/2011

* cited by examiner

$$P_{BKUP} \geq P_{BF} = f(Diff(MI_{LOCK}, MI_{LR}))$$

FIG. 10

VEHICLE BRAKE DEVICE

TECHNICAL FIELD

The present invention relates to a vehicle brake device that has an electric parking brake mechanism (hereinafter referred to as an EPB).

BACKGROUND ART

In related art, PTL 1 discloses a vehicle brake mechanism in which an EPB and a service brake that is formed by a hydraulic brake device are combined. In this brake mechanism, when the EPB is actuated and released, the EPB and the service brake that uses hydraulic pressure are used at the same time. Thus, the volume of the EPB is reduced and size reduction and cost reduction are attained. Specifically, when the EPB is actuated and released, the brake fluid pressure in a wheel cylinder (hereinafter referred to as a W/C) is increased (hereinafter referred to as back-up pressurization) by the service brake, a piston in the W/C is pressed, and a load applied to a motor of the EPB is reduced. Thus, the actuation and release of the EPB can be performed even when the output of the motor is reduced. Further, a road slope angle and a load weight etc. are detected in advance. Based on these pieces of information, the necessity for hydraulic assist when the EPB is actuated and released, and a hydraulic pressure value to be generated by the service brake when the hydraulic assist is necessary are estimated, thus generating an appropriate hydraulic pressure by the service brake.

CITATION LIST

Patent Literature

[PTL 1]
Japanese Translation of PCT International Application Publication NO. JP-T-2007-519568

SUMMARY OF INVENTION

Technical Problem

However, in the above-described vehicle brake mechanism disclosed in PTL 1, whether or not the back-up pressurization by the service brake is necessary and the hydraulic pressure value to be generated are determined only using information that is obtained by a sensor or the like before the EPB is actually actuated. Therefore, a problem may arise in which it is not possible to overcome a self-locking force of the EPB and the EPB cannot be released, because the output of the EPB decreases by more than an estimation depending on an actuation condition of the EPB, or because of an increase in frictional resistance of a self-locking portion of the EPB, a temperature change or a change over time etc.

In light of the foregoing, it is an object of the present invention to provide a vehicle brake device that can release a parking brake force by causing an EPB to reliably perform a release operation.

Solution to Problem

In order to achieve the above-described object, in the invention described in claim 1, release control means includes: release impossible determination means for determining a release impossible state in which a release operation cannot be performed, based on a fact that a motor current that is supplied to an electric motor in release control is maintained in a state of a locked rotor current; pressurization means for pressing a piston by generating a brake fluid pressure in a wheel cylinder using a service brake when the release impossible state is determined, and for performing back-up pressurization that presses a friction-applying member against a friction-applied member; and release means for causing an EPB to perform the release operation and releasing a parking brake force by driving the electric motor to rotate in a reverse direction when the back-up pressurization is being performed.

In this manner, when the release impossible state is determined in which the release operation cannot be performed when the release control is performed, the back-up pressurization by the service brake is performed. Thus, the piston is pressed by a W/C pressure in a direction in which the friction-applying member is pressed against the friction-applied member, a load that is applied to the electric motor of the EPB is reduced, and it is possible to perform the release operation even when the output of the electric motor is small in comparison to when the back-up pressurization is not performed. Therefore, it is possible to provide a vehicle brake device that can cause the EPB to reliably perform the release operation and can release the parking brake force.

For example, as described in claim 2, the pressurization means can perform the back-up pressurization based on an automatic pressurization function of brake fluid pressure adjustment means that is provided in the service brake. Further, as described in claim 3, the pressurization means can also use a notification device to perform notification of the release impossible state when the release impossible state is determined by the release impossible determination means, and thus can cause a driver to operate the service brake and to perform the back-up pressurization. In this case, it is preferable that, basically, the back-up pressurization is performed based on the automatic pressurization function of the brake fluid pressure adjustment means, and when, for example, the brake fluid pressure adjustment means fails and the automatic pressurization function cannot be performed, the driver is caused to operate the service brake and to perform the back-up pressurization In the invention described in claim 4, the release control means includes: drive stop means for stopping the supply of the motor current to the electric motor when the release impossible state is determined by the release impossible determination means; and re-drive means for once more performing the supply of the motor current to the electric motor that has been stopped by the drive stop means, when the back-up pressurization is performed, and for driving the electric motor to rotate in the reverse direction.

In this manner, when the release impossible state is determined in the release impossible determination, the electric motor is temporarily stopped and then the back-up pressurization by the service brake is performed. After that, the electric motor is driven again. By doing this, the load on the electric motor can be reduced and it becomes possible to further improve the durability of the motor and the EPB and to reduce electric power consumption.

In the invention described in claim 5, the pressurization means generates, as the back-up pressurization, at least a brake fluid pressure that corresponds to a difference between a motor current value at the end of previous lock control performed before the release control and a value of the locked rotor current.

The difference between the motor current value at the end of the previous lock control performed before the release control and the locked rotor current value becomes a value that corresponds to a decrease amount of the output of the EPB generated from a lock time to a release time. Therefore, if at least the back-up pressurization corresponding to the difference is performed, it is possible to cause the release operation to be performed.

BRIEF DESCRIPTION OF DRAWINGS

[FIG. 1]

[FIG. 2]

[FIG. 3]

[FIG. 4]

[FIG. 5]

[FIG. 6]

[FIG. 7]

[FIG. 8]

[FIG. 9]

[FIG. 10]

DESCRIPTION OF EMBODIMENTS

Hereinafter, embodiments of the present invention will be explained based on the drawings. Note that, in the respective embodiments below, portions that are the same or equivalent to each other are explained by assigning the same reference numerals thereto.
(First Embodiment)

Figure 1:
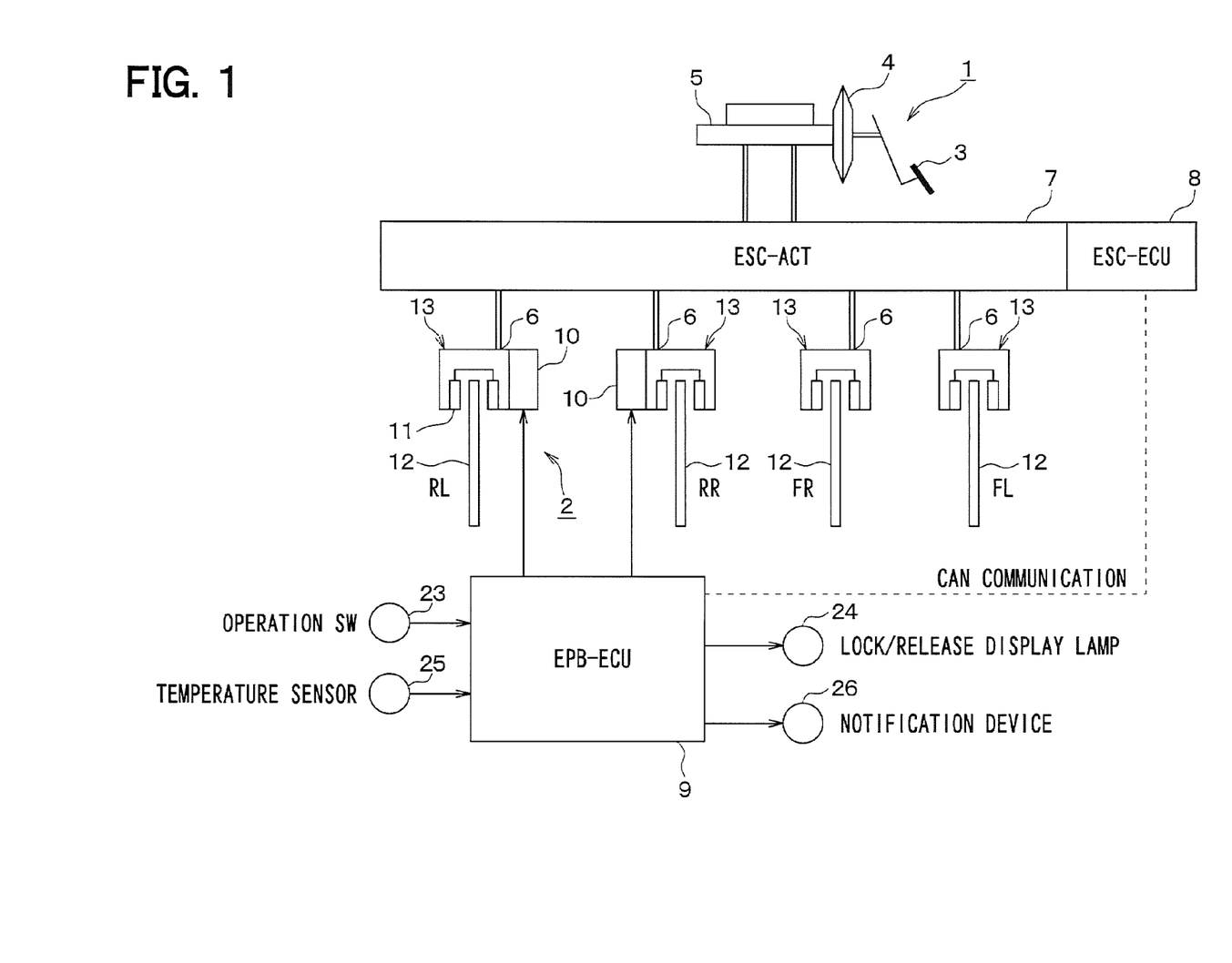
FIG. 1 is a schematic diagram showing an overall outline of a vehicle brake device according to a first embodiment of the present invention.
Figure 2:
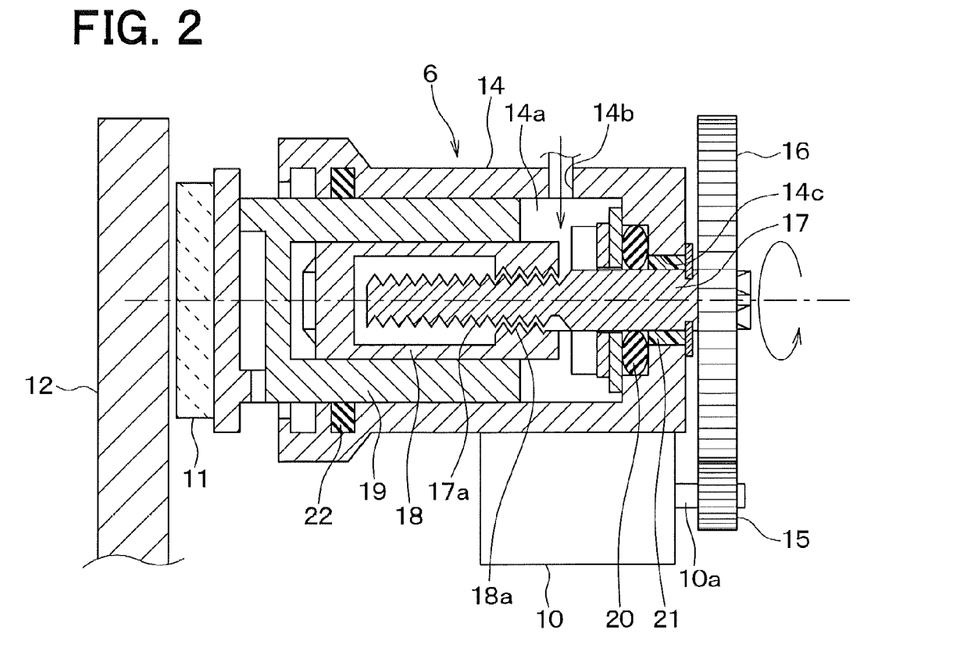
FIG. 2 is a cross-sectional schematic diagram of a rear wheel brake mechanism that is provided in the vehicle brake device.

A first embodiment of the present invention will be explained. In the present embodiment, a vehicle brake device in which a disc brake type EPB is applied to a rear wheel system will be explained as an example. FIG. 1 is a schematic diagram showing an overall outline of the vehicle brake device according to the present embodiment. FIG. 2 is a cross-sectional schematic diagram of a rear wheel brake mechanism that is provided in the vehicle brake device. Hereinafter, an explanation will be made with reference to these drawings.

As shown in FIG. 1, the vehicle brake device is provided with a service brake 1 that generates a service brake force based on a brake operation of a driver, and an EPB 2 that restricts movement of a vehicle at the time of parking or the like.

The service brake 1 is a hydraulic brake mechanism that generates a brake fluid pressure based on depression of a brake pedal 3 by the driver, and generates a service brake force based on the brake fluid pressure. Specifically, the service brake 1 boosts the pedal depression force that corresponds to the depression of the brake pedal 3 by the driver, using a servo unit 4. After that, a brake fluid pressure corresponding to the boosted pedal depression force is generated in a master cylinder (hereinafter referred to as an M/C) 5. Then, the brake fluid pressure is transmitted to a wheel cylinder (hereinafter referred to as a W/C) 6, which is connected to the M/C 5 and which is provided in a brake mechanism of each wheel, thereby generating the service brake force. In the present embodiment, the brake pedal 3, the servo unit 4 and the M/C 5 correspond to brake fluid pressure generation means of the present invention. Further, an actuator 7 that serves as brake fluid pressure adjustment means is provided between the M/C 5 and the W/C 6, and the service brake force to be generated by the service brake 1 is adjusted, thereby forming a structure in which various types of control (for example, anti-skid control etc.) to improve vehicle safety can be performed.

The various types of control using the actuator 7 are performed by an electronic stability control (ESC)-ECU 8, which corresponds to service brake control means. For example, the ESC-ECU 8 outputs a control current for controlling various types of control valves and a pump drive motor that are not shown in the drawings and that are provided in the actuator 7. The ESC-ECU 8 thereby controls a hydraulic circuit that is provided in the actuator 7, and controls a W/C pressure that is transmitted to the W/C 6. Thus, wheel slip avoidance or the like is performed and the safety of the vehicle is improved. For example, the actuator 7 includes, for each wheel, a pressure increase control valve, a pressure decrease control valve and a pump etc., and the W/C pressure can be controlled to be increased, maintained or reduced. The pressure increase control valve controls application, to the W/C 6, of either the brake fluid pressure generated in the M/C 5 or the brake fluid pressure generated by driving of the pump. The pressure decrease control valve reduces the W/C pressure by supplying the brake fluid in each of the W/Cs 6 to a reservoir. Further, the actuator 7 can realize an automatic pressurization function of the service brake 1 in which the W/C 6 can be automatically pressurized based on control of the driving of the pump and control of the various types of control valves, even when there is no brake operation. The structure of the actuator 7 is a known structure, and a detailed explanation thereof is therefore omitted here.

Meanwhile, the EPB 2 generates a parking brake force by controlling the brake mechanism using electrically-operated motors 10. The EPB 2 is configured such that it includes an EPB control device (hereinafter referred to as an EPB-ECU) 9 that controls the drive of the motors 10.

The brake mechanism is a mechanical structure that generates a brake force in the vehicle brake device of the present embodiment. A front wheel brake mechanism is a structure that generates a service brake force by an operation of the service brake 1. Meanwhile, the rear wheel brake mechanism is a dual-operation structure that generates a brake force in response to both the operation of the service brake 1 and the operation of the EPB 2. The front wheel brake mechanism is a generally used known brake mechanism, and does not include the mechanism that generates a brake force based on the operation of the EPB 2, unlike the rear wheel brake mechanism. Therefore, an explanation thereof is omitted here, and the rear wheel brake mechanism will be explained below.

Not only when the service brake 1 is actuated but also when the EPB 2 is actuated, the rear wheel brake mechanism presses a brake pad 11, which is a friction-applying member shown in FIG. 2, and a brake disc 12, which is a friction-applied member, is sandwiched by the brake pads 11. Thus, a frictional force is generated between the brake pads 11 and the brake disc 12 and the brake force is generated.

Specifically, in a caliper 13 shown in FIG. 1, the brake mechanism rotates the motor 10 that is directly fixed to a body 14 of the W/C 6 for pressing the brake pads 11, as shown in FIG. 2, and thereby rotates a spur gear 15 that is provided on a drive shaft 10a of the motor 10. Then, the brake mechanism transmits the torque (output) of the motor 10 to a spur gear 16 that is meshed with the spur gear 15, and thereby moves the brake pads 11. Thus, the parking brake force by the EPB 2 is generated.

In the caliper 13, in addition to the W/C 6 and the brake pads 11, a part of an end face of the brake disc 12 is housed such that it is sandwiched between the brake pads 11. The W/C 6 is configured such that when brake fluid pressure is supplied to a hollow section 14a of the cylinder shaped body 14 through a passage 14b, W/C pressure is generated inside the hollow section 14a that is a brake fluid chamber. The W/C 6 is configured to include, in the hollow section 14a, a rotation shaft 17, a propeller shaft 18, a piston 19 and so on.

An end of the rotation shaft 17 is connected to the spur gear 16 through an insertion hole 14c that is formed in the body 14. When the spur gear 16 is rotated, the rotation shaft 17 is rotated along with the rotation of the spur gear 16. A male screw groove 17a is formed in an outer peripheral surface of the rotation shaft 17 at another end of the rotation shaft 17 that is on the opposite side to the end connected to the spur gear 16. Meanwhile, the other end of the rotation shaft 17 is inserted into the insertion hole 14c, and is thereby supported axially. More specifically, the insertion hole 14c is provided with an O-ring 20 and a bearing 21. The O-ring 20 prevents the brake fluid from leaking through between the rotation shaft 17 and an inner wall surface of the insertion hole 14c, while the bearing 21 axially supports the other end of the rotation shaft 17.

The propeller shaft 18 is a nut that is a hollow tubular member, and a female screw groove 18a that is engaged with the male screw groove 17a of the rotation shaft 17 is formed in an inner wall surface of the propeller shaft 18. For example, the propeller shaft 18 has a column shape or a polygonal column shape and is provided with an anti-rotation key, so that the propeller shaft 18 does not rotate around the rotation center of the rotation shaft 17 when the rotation shaft 17 rotates. Therefore, when the rotation shaft 17 is rotated, the meshing between the male screw groove 17a and the female screw groove 18a converts the torque of the rotation shaft 17 to a force that moves the propeller shaft 18 in the axial direction of the rotation shaft 17. When the drive of the motor 10 is stopped, the propeller shaft 18 stops at the same position due to the frictional force generated by the meshing between the male screw groove 17a and the female screw groove 18a. If the drive of the motor 10 is stopped when a target brake force is reached, the propeller shaft 18 can be held in that position. Thus, a desired parking brake force is maintained and self-locking is achieved. Therefore, in the EPB 2 of the present embodiment, a self-locking portion is formed by the propeller shaft 18 and the above-described rotation shaft 17.

The piston 19 is arranged to surround an outer periphery of the propeller shaft 18, and is formed by a bottomed cylindrical member or a bottomed polygonal cylindrical member. An outer peripheral surface of the piston 19 abuts against an inner wall surface of the hollow section 14a formed in the body 14. In order to inhibit leakage of the brake fluid from between the outer peripheral surface of the piston 19 and an inner wall surface of the body 14, a seal member 22 is provided on the inner wall surface of the body 14. Thus, the W/C pressure can be applied to an end face of the piston 19. The seal member 22 is used to generate a reaction force to pull back the piston 19 when release control is performed after lock control. Since the seal member 22 is provided, basically, even if the brake disc 12 that is inclined during rotation presses into the brake pad 11 and the piston 19 within a range that does not exceed an elastic deformation amount of the seal member 22, it is possible to push them back to the brake disc 12 side and to maintain the brake disc 12 and the brake pad 11 such that they have a predetermined clearance therebetween.

Further, when the propeller shaft 18 is provided with the anti-rotation key in order to ensure that it does not rotate around the rotation center of the rotation shaft 17 when the rotation shaft 17 rotates, the piston 19 is provided with a key groove along which the anti-rotation key slidingly moves. If the propeller shaft 18 has a polygonal column shape, the piston 19 is formed in a polygonal cylindrical shape that corresponds to that shape.

The brake pad 11 is provided at the leading end of the piston 19, and the brake pad 11 is moved in the left-right direction in the drawing along with the movement of the piston 19. More specifically, the piston 19 is configured such that it can move in the left direction in the drawing along with the movement of the propeller shaft 18, and also can move in the left direction in the drawing independently of the propeller shaft 18 when the W/C pressure is applied to an end of the piston 19 (an end that is on the opposite side to the end provided with the brake pad 11). If the brake fluid pressure in the hollow section 14a is not applied (W/C pressure=0) when the propeller shaft 18 is in a release position (a state before the motor 10 is rotated), which is a standby position when the propeller shaft 18 is in a normal released state, the piston 19 is moved in the right direction in the drawing by an elastic force of the seal member 22, which will be described later. The brake pad 11 is thereby moved away from the brake disc 12. If the W/C pressure becomes zero when the motor 10 is rotated and the propeller shaft 18 is moved from an initial position to the left in the drawing, the movement of the piston 19 in the right direction in the drawing is restricted by the moved propeller shaft 18, and the brake pad 11 is held at that position.

In the brake mechanism structured as described above, when the service brake 1 is operated, the W/C pressure generated by the operation of the service brake 1 causes the piston 19 to move in the left direction in the drawing. As a result, the brake pads 11 are pressed against the brake disc 12, and the service brake force is thereby generated. Further, when the EPB 2 is operated, the motor 10 is driven and the spur gear 15 is rotated. Along with this, the spur gear 16 and the rotation shaft 17 are rotated, and the meshing between the male screw groove 17a and the female screw 18a causes the propeller shaft 18 to move to the brake disc 12 side (in the left direction in the drawing). Then, along with this, the leading end of the propeller shaft 18 comes into contact with a bottom surface of the piston 19 and presses the piston 19, and the piston 19 is also moved in the same direction. Thus, the brake pads 11 are pressed against the brake disc 12, and a parking brake force is thereby generated. Thus, it is possible to achieve a dual-operation brake mechanism that generates a brake force in response to both the operation of the service brake 1 and the operation of the EPB 2.

Further, in this type of brake mechanism, if the EPB 2 is actuated when the W/C pressure is 0 and before the brake pads 11 are pressed against the brake disc 12, or even when the W/C pressure is generated by the actuation of the service brake 1, in a state before the propeller shaft 18 is in contact with the piston 19, the load on the propeller shaft 18 is reduced and the motor 10 is driven with almost no load. When the brake disc 12 is pressed by the brake pads 11 in a state in which the propeller shaft 18 is in contact with the piston 19, the parking brake force by the EPB 2 is generated, a load is applied to the motor 10, and the value of a motor current that is caused to flow to the motor 10 corresponding to the magnitude of the load changes. Therefore, by confirming the motor current value, it is possible to confirm a generation state of the parking brake force by the EPB 2.

The EPB-ECU 9 is configured by a well-known microcomputer that is provided with a CPU, a ROM, a RAM, an I/O and the like, and performs parking brake control by controlling the rotation of the motor 10 in accordance with a program stored in the ROM or the like.

The EPB-ECU 9 receives a signal etc. in accordance with an operation state of an operation switch (SW) 23 that is provided on an instrument panel (not shown in the drawings) in a vehicle compartment, for example, and drives the motor 10 in accordance with the operation state of the operation SW 23. Further, the EPB-ECU 9 performs lock control, release control and the like based on the motor current value. Based on the control state, the EPB-ECU 9 ascertains that the lock control is being performed or the wheel is in a locked state by the lock control, and that the release control is being performed or the wheel is in a released state (an EPB released state) by the release control. Then, in accordance with the drive state of the motor 10, the EPB-ECU 9 outputs a signal indicating whether or not the wheel is in a locked state to a lock/release display lamp 24 that is provided on the instrument panel.

In the vehicle brake device structured as described above, basically, an operation to generate a braking force for the vehicle is performed by generating a service brake force by the service brake 1 when the vehicle is travelling. Further, when the vehicle is stopped by the service brake 1, the vehicle stopped state is maintained if the driver depresses the operation SW 23 to actuate the EPB 2 and thereby generates a parking brake force, or thereafter an operation to release the parking brake force is performed. More specifically, the operation of the service brake 1 is such that, if a brake pedal operation is performed by the driver when the vehicle is travelling, the brake fluid pressure generated in the M/C 5 is transmitted to the W/C 6, thereby generating a service brake force. Meanwhile, the operation of the EPB 2 is such that the piston 19 is moved by driving the motor 10 and the parking brake force is generated by pressing the brake pads 11 against the brake disc 12, thereby causing the wheel to be locked, or the parking brake force is released by separating the brake pads 11 from the brake disc 12, thereby causing the wheel to be released.

Specifically, the parking brake force is generated or released by lock/release control. In the lock control, the EPB 2 is actuated by rotating the motor 10 in the forward direction, and the rotation of the motor 10 is stopped at a position where a desired parking brake force can be generated by the EPB 2. Then, this state is maintained. By doing this, the desired parking brake force is generated. In the release control, the EPB 2 is actuated by rotating the motor 10 in the reverse direction, and the parking brake force generated by the EPB 2 is released.

Next, specific parking brake control will be explained that is performed by the EPB-ECU 9 using the brake system configured as described above, in accordance with the above-described various functional portions and the program stored in the built-in ROM that is not shown in the drawings. Note, however, that processing other than parking brake control processing according to a release operation, such as lock control processing, for example, is not changed from the related art, and therefore, only the parking brake control processing according to the release operation will be explained here.

First, a mechanism for the parking brake control processing according to the release operation that is performed in the present embodiment will be explained. The parking brake control processing according to the release operation is performed when the operation SW 23 is used to perform the release operation. For example, when the operation SW 23 is formed as a seesaw switch, it is possible to instruct a lock operation by pressing one end of the seesaw switch and to instruct the release operation by pressing the other end. The parking brake control processing according to the release operation is started when the release operation is instructed.

When the parking brake control processing according to the release operation is started and the release control is performed, the EPB 2 is actuated by rotating the motor 10 in the reverse direction and the parking brake force generated by the EPB 2 is released.

At this time, the motor current value varies in accordance with the load that is applied to the motor 10. Therefore, when the release operation is performed normally, the pressing force of the brake pads 11 against the brake disc 12 gradually decreases, the load that is applied to the motor 10 decreases, and the motor current value also decreases. However, a case can occur in which the output of the motor 10 is less than a value that is necessary to release the self-locking, because of an actuation condition of the EPB 2, such as a decrease in a power supply voltage (a battery voltage) of the EPB 2, or because of an increase in frictional resistance of the self-locking portion, a temperature change or change over time etc. Therefore, when in normal circumstances, since the motor current value varies in accordance with the load that is applied to the motor 10, it is possible to confirm the generated state of the parking brake force by confirming the motor current value. However, when in a release impossible state in which the parking brake force by the EPB 2 cannot be released, the motor current value is maintained in a state of a locked rotor current (a maximum current that flows in a state in which rotation is restricted), and does not vary.

Therefore, the state in which the locked rotor current is maintained in this manner is determined as the release impossible state, and back-up pressurization by the service brake 1 is performed. By doing this, the piston 19 is pressed in a direction in which the brake pads 11 are pressed against the brake disc 12 by the W/C pressure, an axial force (a resistance force of the self-locking portion) that is applied to the propeller shaft 18 is lowered, and the load that is applied to the motor 10 of the EPB 2 is reduced. As a result, even when the output of the motor 10 is small in comparison to when the back-up pressurization is not performed, it is possible to perform the release operation.

Figure 3:
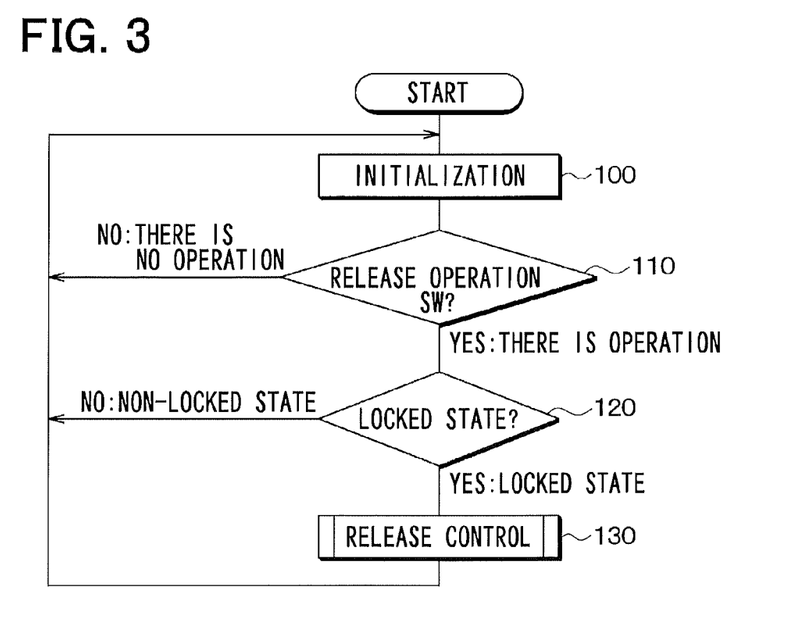
FIG. 3 is an overall flowchart of parking brake control processing according to a release operation.

The parking brake control processing according to the release operation is performed based on this type of mechanism. FIG. 3 is an overall flowchart of the parking brake control processing according to the release operation that is performed by the EPB-ECU 9. This processing is performed at every predetermined control cycle during a period in which, for example, an ignition switch is ON.

First, initialization processing, such as resetting various values that are stored in a not shown memory, is performed at step 100. After that, the processing proceeds to step 110 and it is determined whether or not the release operation has been performed by the operation SW 23. This determination is made based on a signal that corresponds to an operation state of the operation SW 23 that is input into the EPB-ECU 9.

When an affirmative determination is made here, the processing proceeds to step 120 and it is determined whether or not the locked state has been obtained. Since a flag indicating the locked state is set when the lock operation is completed in the lock control processing that is performed before the release control, this determination is made based on whether or not the flag has been set. When an affirmative determination is made, the processing proceeds to step 130 and release control processing is performed. When a negative determination is made at step 110 or step 120, there is no need to perform the release control, and thus the release control processing is not performed and this processing ends.

Figure 4:
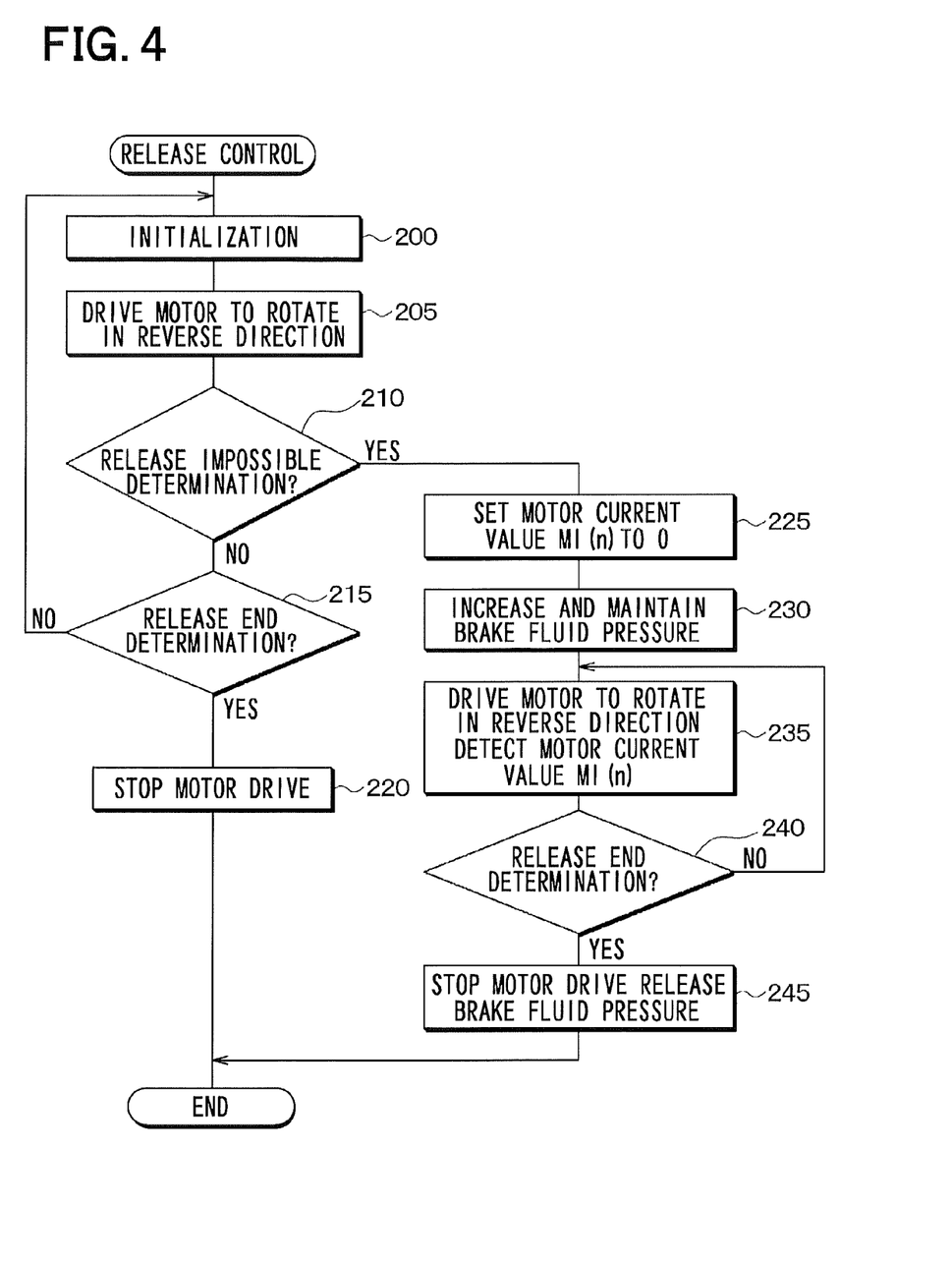
FIG. 4 is a flowchart showing details of release control processing.

Next, the release control processing shown at step 130 in FIG. 3 will be explained in detail with reference to FIG. 4. FIG. 4 is a flowchart showing details of the release control processing.

First, initialization processing, such as resetting various values that are stored in a not shown memory, is performed at step 200. After that, the processing proceeds to step 205 and motor drive is performed. At this time, the motor 10 is rotated in the reverse direction. Then, the processing proceeds to step 210, and release impossible determination processing is performed. At the same time, it is determined whether a release impossible determination result in the release impossible determination processing is Yes or No. The release impossible determination processing is processing that determines whether or not the EPB 2 is in the release impossible state. The release impossible determination processing will be explained with reference to a flowchart showing details of the release impossible determination processing shown in FIG. 5.

Figure 5:
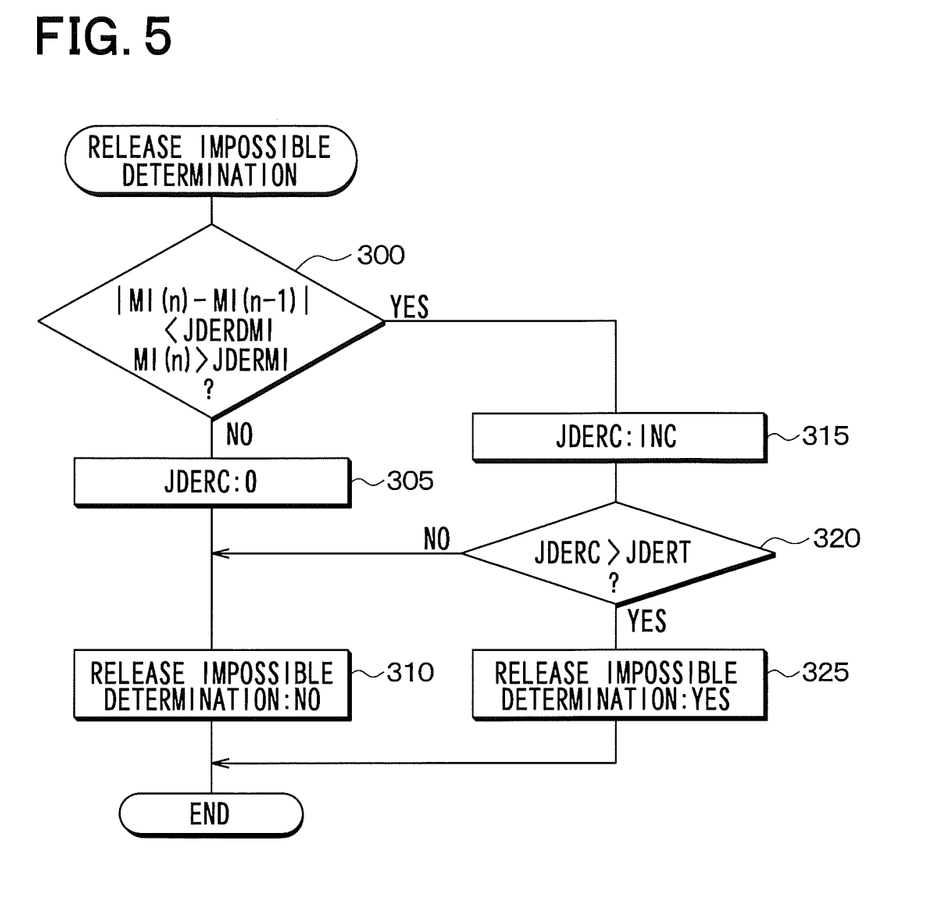
FIG. 5 is a flowchart showing details of release impossible determination processing.

In the release impossible determination processing, the release impossible state is determined based on a fact that the locked rotor current state is maintained when the release operation is performed as described above. Specifically, first, at step 300, it is determined whether or not an absolute value of a difference |MI (n)−MI (n−1)| between a motor current value MI (n) of this control cycle and a motor current value MI (n−1) of the previous control cycle is less than a release impossible determination current change amount JDERDMI, and also whether or not the motor current value MI (n) of this control cycle exceeds a release impossible determination current value JDERMI.

The release impossible determination current change amount JDERDMI is set to a value that corresponds to a state in which there is almost no change in the change amount of the motor current value represented by the above-described absolute value of the difference |MI (n)−MI (n−1)|, namely, a value at which the gradient of the motor current value is assumed to be 0, and the value is set while taking noise etc. into consideration. The release impossible determination current value JDERMI is a threshold value that is used as the basis for determining that the motor current value is a value that is assumed to be the locked rotor current. If the above-described absolute value of the difference |MI (n)−MI (n−1)| is less than the release impossible determination current change amount JDERDMI, it means that the motor current value is a constant value. Further, if the motor current value MI (n) exceeds the release impossible determination current value JDERMI, it means that the motor current is a current that is almost the same level as the locked rotor current. Therefore, when both the conditions are satisfied, there is a possibility that the locked rotor current state is being maintained.

Therefore, when a negative determination is made at step 300, the processing proceeds to step 305 and a release impossible determination counter JDERC, which is used to measure a time period during which the locked rotor current state is maintained, is reset to 0. After that, the processing proceeds to step 310 and the release impossible determination result is set to No. For example, a flag indicating the release impossible state is reset. Then, when an affirmative determination is made at step 300, the processing proceeds to step 315 and the release impossible determination counter JDERC, which is used to measure the time period during which the locked rotor current state is maintained, is incremented.

After that, the processing proceeds to step 320 and it is determined whether or not the release impossible determination counter JDERC has exceeded a release impossible determination time JDERT that is used as the basis for determining that the locked rotor current state is being maintained. Then, until an affirmative determination is made at step 320, the processing proceeds to step 310 and the release impossible determination result is set to No. When the affirmative determination is made, the processing proceeds to step 325 and the release impossible determination result is set to Yes. For example, the flag indicating the release impossible state is set. The release impossible determination is performed in this manner.

Then, when the release impossible determination is completed, the determination at step 210 shown in FIG. 4 is performed based on the release impossible determination result. When the EPB 2 is in a state in which the release operation is possible as usual, the release impossible determination result is No. Therefore, the processing proceeds to step 215 and release end determination processing is performed. At the same time, it is determined whether a result of the release end determination processing is Yes or No. The release end determination processing is processing that determines whether or not a timing to end the release control by the EPB 2 has been reached. The release end determination processing will be explained with reference to a flowchart that shows details of the release end determination processing shown in FIG. 6.

Figure 6:
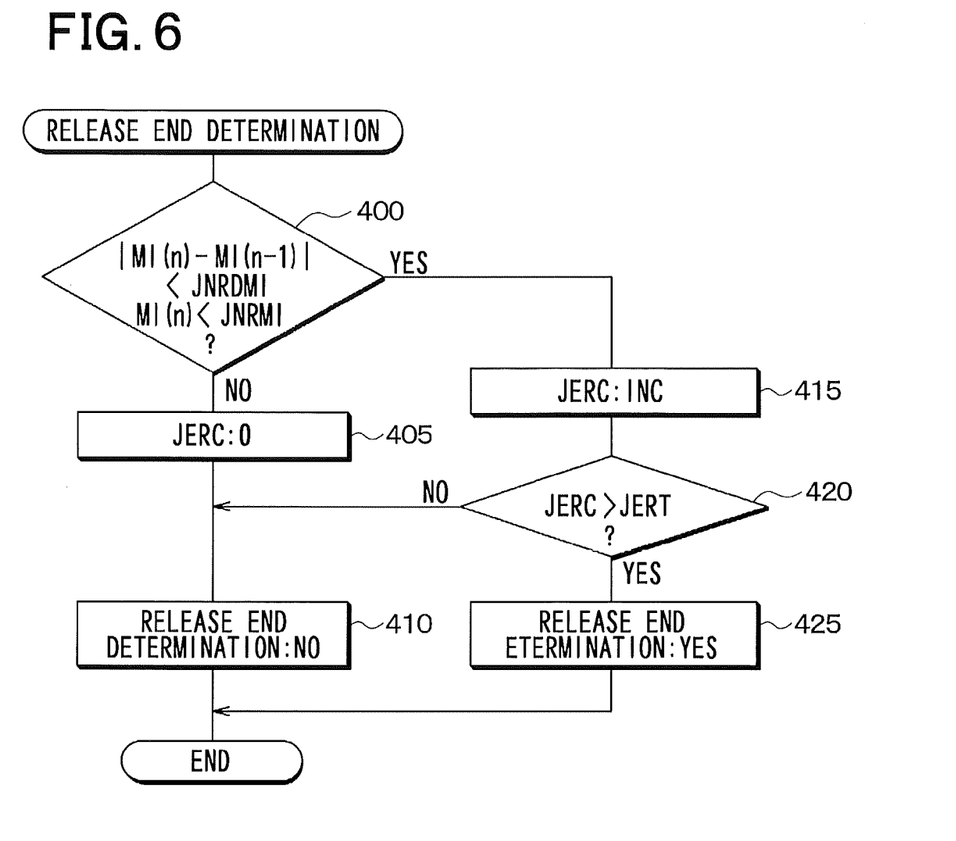
FIG. 6 is a flowchart showing details of release end determination processing.

In the release end determination processing, when the release operation is performed as described above, if the brake pads 11 move so as to separate from the brake disc 12 in accordance with the reverse rotation of the motor 10 and the clearance between them reaches a predetermined amount, it is determined that the timing to end the release control has been reached. Specifically, first, at step 400, it is determined whether or not the absolute value of the difference |MI (n)−MI (n−1)| between the motor current value MI (n) of this control cycle and the motor current value MI (n−1) of the previous control cycle is less than a no-load determination current change amount JNRDMI, and also whether or not the motor current value MI (n) of this control cycle is less than a no-load determination current value JNRMI.

The no-load determination current change amount JNRDMI is set to a value that corresponds to a state in which there is almost no change in the change amount of the motor current value represented by the above-described absolute value of the difference |MI (n)−MI (n−1)|, namely, a value at which the gradient of the motor current value is assumed to be 0, and the value is set while taking noise etc. into consideration. The no-load determination current value JNRMI is a threshold value that is used as the basis for determining that the motor current value is a value that is assumed to be a no-load current. If the above-described absolute value of the difference |MI (n)−MI (n−1)| is less than the no-load determination current change amount JNRDMI, it means that the motor current value is a constant value. Further, if the motor current value MI (n) is less than the no-load determination current value JNRMI, it means that the motor current is a current that is almost the same level as the no-load current. Therefore, when both the conditions are satisfied, it can be said that the no-load current has been reached.

Therefore, if a negative determination is made at step 400, the processing proceeds to step 405, and a release end determination counter JERC, which is used to measure a time period during which the no-load current state is maintained, is reset to 0. After that, the processing proceeds to step 410 and the result of the release end determination is set to No. For example, a flag indicating a release end state is reset. Then, when an affirmative determination is made at step 400, the processing proceeds to step 415, and the release end determination counter JERC, which is used to measure the time period during which the no-load current state is maintained, is incremented.

After that, the processing proceeds to step 420, and it is determined whether or not the release end determination counter JERC has exceeded a release end determination time JERT that is used as the basis for determining that the clearance between the brake pads 11 and the brake disc 12 has reached the predetermined amount, namely, whether or not a predetermined time period has elapsed in the no-load current state. Then, until an affirmative determination is made at step 420, the processing proceeds to step 410 and the result of the release end determination is set to No. When the affirmative determination is made, the processing proceeds to step 425 and the result of the release end determination is set to Yes. For example, the flag indicating the release end state is set.

The release end determination is performed in this manner. Then, when the release end determination is completed, the determination at step 215 shown in FIG. 4 is performed based on the result of the release end determination. Here, until the determination result of the release end determination becomes Yes, the release operation is continued. When the determination result becomes Yes, the processing proceeds to step 220 and the motor drive is stopped. Thus, the release control processing ends.

On the other hand, when the release impossible determination result is Yes at step 210, namely, when the release impossible state is determined, the processing proceeds to step 225 and onward and the back-up pressurization by the service brake 1 is performed so that it is possible to perform the release operation.

Specifically, the motor drive is temporarily stopped by setting the motor current value MI (n) to 0 at step 225. After that, the processing proceeds to step 230 and the brake fluid pressure is generated based on the automatic pressurization function of the service brake 1, thus increasing and maintaining the W/C pressure. At this time, the increased W/C pressure is maintained when the W/C pressure reaches a target hydraulic pressure. It is preferable to set the target hydraulic pressure to a maximum output value of the automatic pressurization function, namely, a W/C pressure when a maximum output of a motor that is provided in the actuator 7 is exerted. However, a constant value that is lower than that may be set. In summary, in order to cause the EPB 2 in the release impossible state to perform the release operation, it is sufficient if the back-up pressurization can be performed to compensate for the output of the EPB 2 that has decreased.

Figure 9:
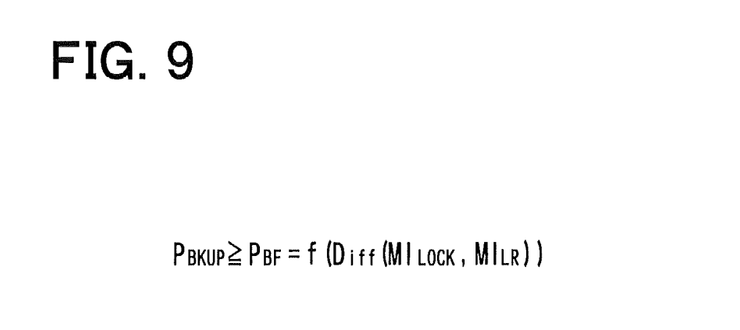
FIG. 9 is a chart showing a way to determine a brake fluid pressure PBKUP in back-up pressurization.

For example, as shown in FIG. 9, a difference Diff between a motor current value $MI_{LOCK}$ at the end of the previous lock control performed before the release control, namely, a value corresponding to a load that is assumed to be applied to the motor 10 when the release control is started, and a locked rotor current value $MI_{LR}$ when the release control is performed this time becomes a value that corresponds to a decrease amount of the output of the EPB 2 generated from the lock time to the release time. Therefore, as shown in FIG. 9, if the back-up pressurization is performed with a brake fluid pressure $P_{BKUP}$ that is equal to or larger than a brake fluid pressure $P_{BF}$ corresponding to this difference Diff, it is possible to cause the release operation to be performed.

Therefore, when a desired W/C pressure is generated at step 230, the processing proceeds to step 235 and motor drive is performed such that the motor 10 is rotated reversely. Further, the motor current value MI (n) is detected. After that, the processing proceeds to step 240 and the release end determination is performed in a similar manner to the above-described step 215. At the same time, it is determined whether the result of the release end determination processing is Yes or No. Then, until the determination result of the release end determination becomes Yes, the release operation is continued. When the determination result becomes Yes, the processing proceeds to step 245 and the motor drive is stopped. At the same time, the brake fluid pressure generated based on the automatic pressurization function of the service brake 1 is released, and the release control processing ends.

Figure 7:
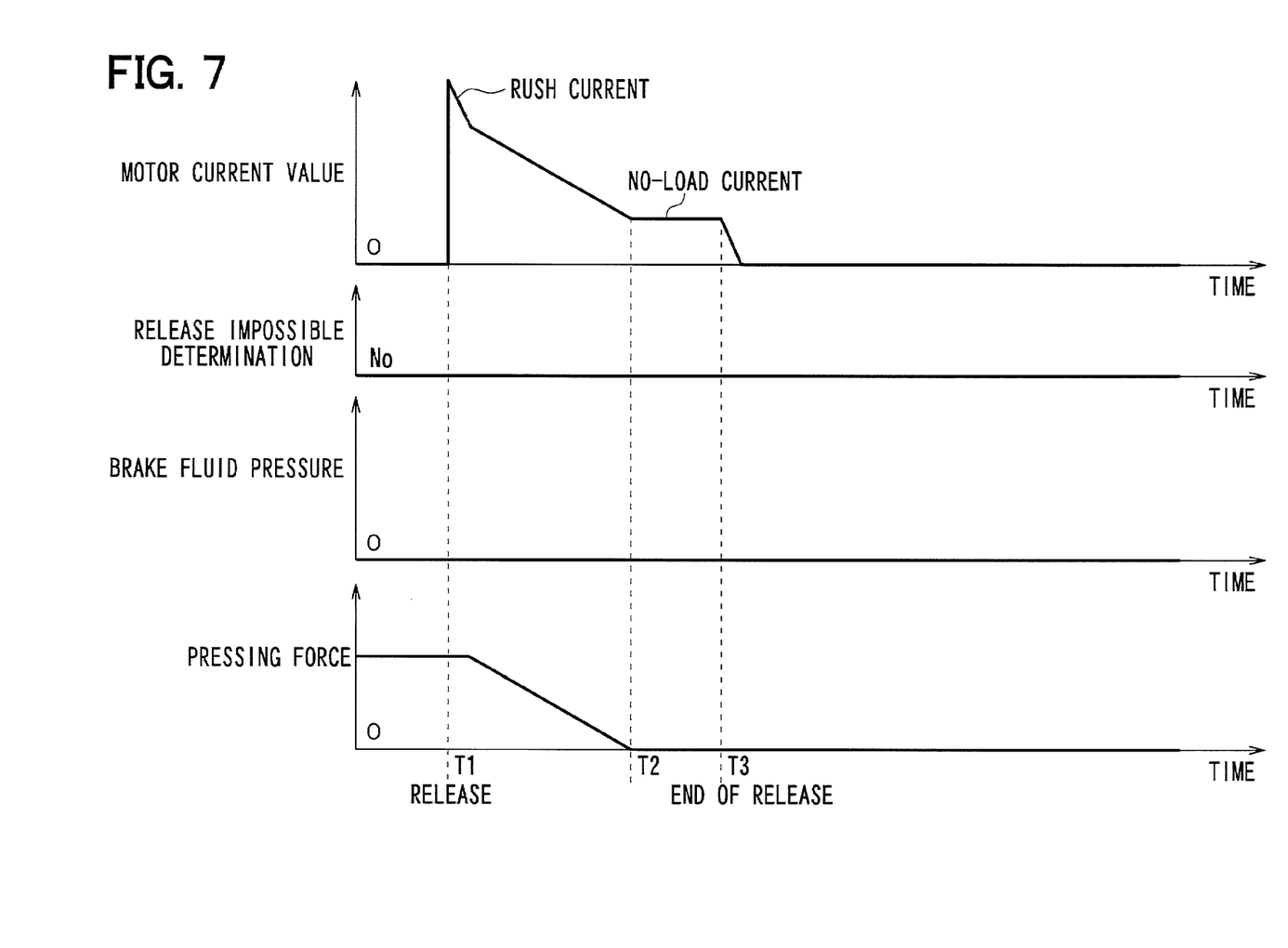
FIG. 7 is a timing chart when the release operation can be performed normally.
Figure 8:
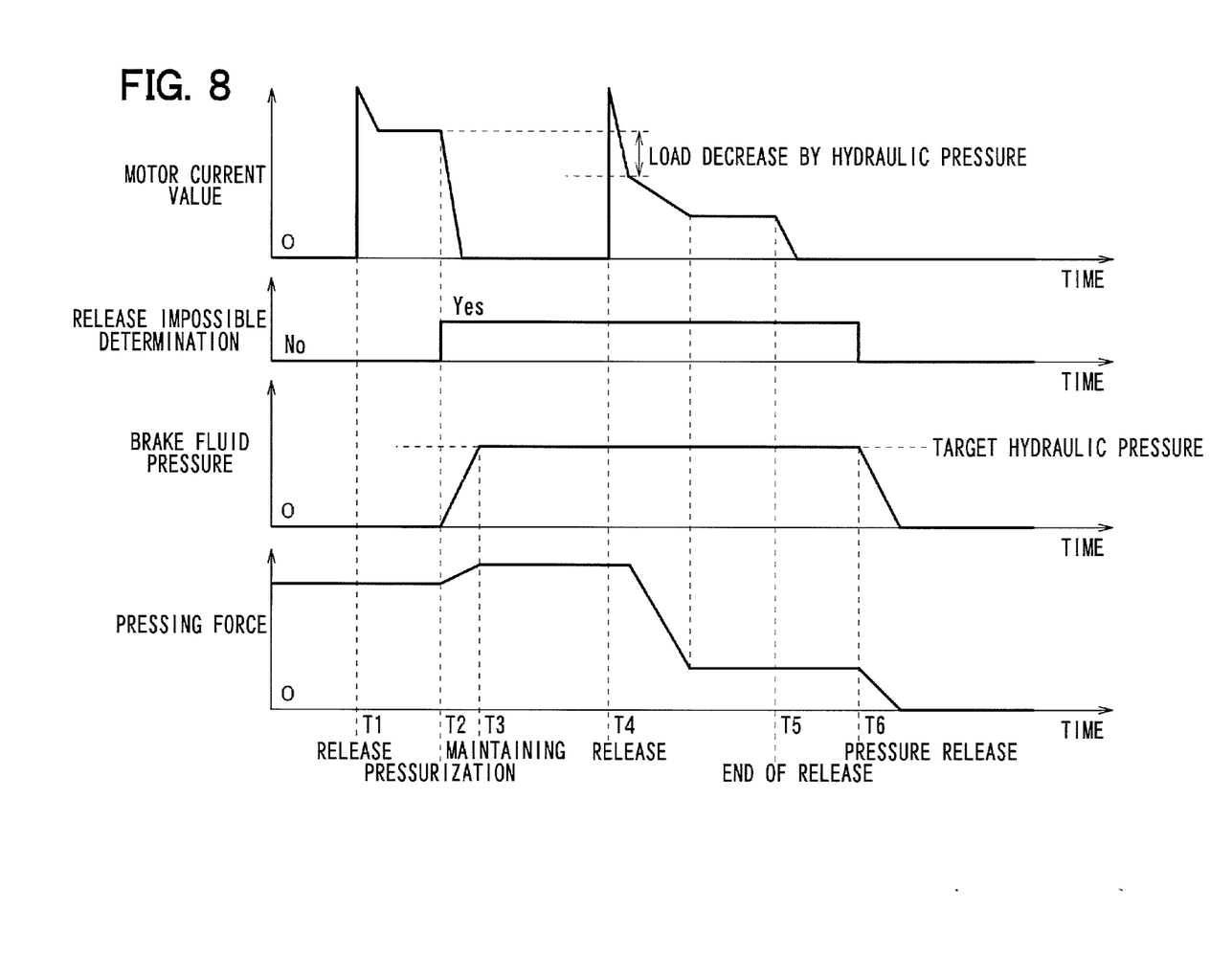
FIG. 8 is a timing chart when the release operation cannot be performed.

FIG. 7 and FIG. 8 are timing charts when the parking brake control processing such as that described above is performed. FIG. 7 is a timing chart when the release operation can be performed normally, and FIG. 8 is a timing chart when the release operation cannot be performed due to a decrease in the output of the EPB 2.

When the release operation can be performed normally, as shown in FIG. 7, the release control is started at a time point T1, and after a rush current occurs, the motor current value becomes a value that corresponds to a load applied to the motor 10. Then, as the release operation proceeds, the pressing force of the brake pads 11 against the brake disc 12 gradually decreases, and the motor current value also decreases. At this time, the determination result of the release impossible determination is No, and there is no need to generate the brake fluid pressure by the automatic pressurization function of the service brake 1. Thus, the brake fluid pressure becomes 0.

Then, at a time point T2, when the brake pads 11 are separated from the brake disc 12, the motor current value becomes a no-load current value. After that, the no-load current value is continued for a predetermined period. When the clearance between the brake pads 11 and the brake disc 12 reaches the predetermined amount at a time point T3, it is determined that the timing to end the release control has been reached, and the release control ends.

In contrast to this, when the release operation cannot be performed due to the decrease in the output of the EPB 2, as shown in FIG. 8, the release control is started at the time point T1, and after a rush current occurs, the motor current value becomes a value that corresponds to the load applied to the motor 10. However, since the release operation cannot be performed, the pressing force of the brake pads 11 against the brake disc 12 does not decrease and becomes constant, and the motor current value is maintained at the locked rotor current value and also becomes constant. If this state continues for a predetermined period until the time point T2, the determination result of the release impossible determination becomes Yes. Based on this, the driving of the motor 10 is stopped temporarily, and the brake fluid pressure is generated by the automatic pressurization function of the service brake 1, thus performing the back-up pressurization.

Then, when the W/C pressure reaches the target hydraulic pressure due to the back-up pressurization at the time point T3, the W/C pressure is maintained and the motor 10 is driven again at a time point T4 and is rotated reversely. At this time, the load applied to the motor 10 has been reduced based on the back-up pressurization. Therefore, the release operation can be performed even when the motor current value is smaller than the value when there is no back-up pressurization. After that, the release operation is performed in the same manner as when the release operation can be performed normally as shown in FIG. 7. When the clearance between the brake pads 11 and the brake disc 12 reaches the predetermined amount at a time point T5, the driving of the motor 10 is stopped. After that, at a time point T6, the brake fluid pressure generated by the automatic pressurization function of the service brake 1 is also released, and the pressing force of the brake pads 11 against the brake disc 12 also becomes 0.

As explained above, in the vehicle brake device according to the present embodiment, when it is determined to be the release impossible state in which the release operation cannot be performed when the release control is performed, the back-up pressurization by the service brake 1 is performed. By doing this, the piston 19 is pressed in a direction in which the brake pads 11 are pressed against the brake disc 12 by the W/C pressure, and the load applied to the motor 10 of the EPB 2 is reduced. As a result, even when the output of the motor 10 is small in comparison to when the back-up pressurization is not performed, it is possible to perform the release operation.

Further, when it is determined to be the release impossible state in the release impossible determination, the motor 10 is temporarily stopped and then the back-up pressurization by the service brake 1 is performed. After that, the motor 10 is driven again. By doing this, the load on the motor 10 can be reduced and the durability of the motor 10 can be secured. At the same time, it is possible to reduce electric power wastage.

(Other Embodiments)

In the above-described embodiment, when it is determined to be the release impossible state in the release impossible determination, the motor 10 is temporarily stopped and then the back-up pressurization by the service brake 1 is performed. After that, the motor 10 is driven again. This is to secure the durability of the motor 10 by reducing the load on the motor 10, and to reduce electric power wastage. However, in order to start the release operation earlier, the driving of the motor 10 may be continued without stopping it.

Further, in the above-described embodiment, the release impossible determination is performed based on the change amount of the motor current value. However, the determination may be performed by comparing the motor current value with a constant value that is obtained by taking into consideration a power supply voltage, a motor temperature and the like. For example, the motor temperature can be detected based on a detection signal that is input to the EPB-ECU 9 from a temperature sensor 25 that is provided on the motor 10, as shown in FIG. 1.

Figure 10:
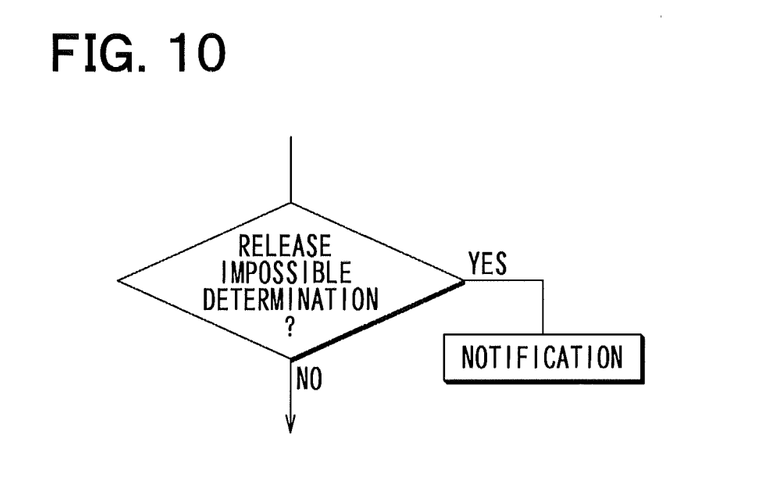
FIG. 10 is a chart showing another operation of the back-up pressurization.

Further, in the above-described embodiment, the back-up pressurization based on the automatic pressurization function of the service brake 1 is performed when in the release impossible state. However, instead of the back-up pressurization by the automatic pressurization function, it is also possible to cause the back-up pressurization to be performed by a manual operation of a driver. For example, as shown in FIG. 10, when the release impossible state is determined in the release impossible determination, a signal may be transmitted from the EPB-ECU 9 to a notification device 26, and notification to cause the brake pedal 3 to be depressed may be performed through the notification device 26. It is thus possible to perform the back-up pressurization by the driver depressing the brake pedal 3.

By doing this, even with a vehicle brake device that does not have the automatic pressurization function, it is possible to cause the EPB 2 to reliably perform the release operation. Further, even with a vehicle brake device that has the automatic pressurization function, a situation can occur in which the automatic pressurization function cannot be used. Even in this case, it is possible to cause the EPB 2 to reliably perform the release operation. In this case, it is preferable that, during normal operation, the back-up pressurization is performed based on the automatic pressurization function, and when the automatic pressurization function cannot be used because of a failure of the actuator 7 or the like, the driver is allowed to manually operate the service brake 1 and to perform the back-up pressurization.

Further, in the above-described embodiment, the back-up pressurization by the service brake 1 is ended when the result of the release end determination becomes Yes, namely, when the clearance between the brake pads 11 and the brake disc 12 reaches the predetermined amount. However, this is merely an example, and the back-up pressurization can be ended anytime when a situation is reached in which the release operation can be performed without a problem. That is, when the back-up pressurization is ended, if the brake pads 11 and the brake disc 12 are still in contact with each other, the axial force that is applied from the piston 19 to the propeller shaft 18 increases again. At this time, even when the output of the motor 10 has decreased, if the axial force is reduced to a level at which the self-locking can be released, the release operation can be performed without a problem even if the back-up pressurization is ended. Accordingly, after that, the back-up pressurization can be ended at any timing. Therefore, the back-up pressurization may be ended at a timing at which, for example, the release end determination counter JERC is started to be incremented in the release end determination processing.

Further, also with regard to a back-up pressurization amount, for example, a W/C pressure that is equal to or more than the brake fluid pressure that corresponds to the difference between the motor current value at the end of the previous lock control performed before the release control and the locked rotor current value is generated as the back-up pressurization. However, without being limited to this example, the W/C pressure to be generated by the back-up pressurization may be determined based on a temperature difference between a temperature when locking is ended and a temperature when the release control is performed this time. More specifically, since the output of the motor 10 varies due to a change in the magnetic force etc. of a magnet that is provided in the motor 10, a W/C pressure that is necessary for the back-up pressurization can be calculated based on the aforementioned temperature difference. Further, when the back-up pressurization has also been used in the previous lock control, it is also possible to determine, based on the brake fluid pressure at that time, the W/C pressure to be generated by the back-up pressure.

In the above-described embodiment, the explanation is given using the disc brake as an example. However, with regard to another form of brake mechanism, such as a drum brake, the present invention can be applied to a brake system that is configured as a parking brake integrated pressurization mechanism in which the service brake 1 and the pressurization mechanism of the EPB 2 are integrated. When a drum brake is used as the brake mechanism, the friction-applying member and the friction-applied member are a brake shoe and a drum, respectively.

Further, although in the above-described embodiment, the EPB-ECU 9 is used as an example of electronic control means. However, the present invention is not limited to this example. For example, in the above-described embodiment, the structure provided with the ESC-ECU 8 and the EPB-ECU 9 is used as an example of the control device. However, these may be configured as an integrated ECU and may thus form the electronic control means, or the electronic control means may be realized by another ECU. That is, the present invention may have a structure other than the structure of the above-described embodiment, as long as, in the brake system that is provided with the service brake 1 and the EPB 2, control of both the service brake force and the parking brake force is realized by the electronic control means, using the parking brake integrated pressurization mechanism.

Note that the steps shown in each of the drawings correspond to means for performing various types of processing. More specifically, of the EPB-ECU 9, a portion that performs the processing at step 130 corresponds to release control means, a portion that performs the processing at step 210 corresponds to release impossible determination means, a portion that performs the processing at step 225 corresponds to drive stop means, a portion that performs the processing at step 230 corresponds to pressurization means, and a portion that performs the processing at step 235 corresponds to release means or re-drive means.

REFERENCE SIGNS LIST

1 . . . Service brake
2 . . . EPB
5 . . . M/C
6 . . . W/C
7 . . . Actuator
8 . . . ESC-ECU
9 . . . EPB-ECU
10 . . . Motor
11 . . . Brake pad
12 . . . Brake disc
13 . . . Caliper
14 . . . Body
14a . . . Hollow portion
14b . . . Passage
17 . . . Rotation shaft
17a . . . Male screw groove
18 . . . Propeller shaft
18a . . . Female screw groove
19 . . . Piston
23 . . . Operation SW

The invention claimed is:

1. A vehicle brake device comprising:
a friction-applying member;
a friction-applied member that is attached to a wheel;
an electric parking brake that generates a braking force by electric power using the friction-applying member and the friction-applied member;
a service brake that generates a braking force by brake fluid pressure using the friction-applying member and the friction-applied member; and
electronic control means for controlling operations of the electric parking brake and the service brake,
wherein
the service brake includes
brake fluid pressure generation means for generating a brake fluid pressure, and
a wheel cylinder which is connected to the brake fluid pressure generation means, and which generates a braking force by a piston being pressed by an increase in the brake fluid pressure and causing the friction-applying member to come into contact with and press against the friction-applied member, and which moves the friction-applying member together with the piston in a direction in which the friction-applying member is separated from the friction-applied member by a decrease in the brake fluid pressure,
the electric parking brake moves the friction-applying member together with the piston based on a torque of an electric motor, moves the piston by driving the electric motor to rotate in a forward direction, and thereby causes the friction-applying member to come into contact with and press against the friction-applied member, thus generating a parking brake force,
the electric parking brake is also configured to move the piston by driving the electric motor to rotate in a reverse direction, and to thereby cause the friction-applying member to be separated from the friction-applied member, thus releasing the parking brake force,
the electronic control means includes release control means for performing release control that releases the parking brake force by driving the electric motor to rotate in the reverse direction and causing the electric parking brake to perform a release operation, and
the release control means includes
release impossible determination means for determining a release impossible state in which the release operation cannot be performed, based on a fact that a motor current that is supplied to the electric motor in the release control is maintained in a state of a locked rotor current,
pressurization means that performs, when the release impossible state is determined, back-up pressurization for pressing the piston by generating a brake fluid pressure in the wheel cylinder using the service brake and for pressing the friction-applying member against the friction-applied member, and
release means for causing the electric parking brake to perform the release operation and releasing the parking brake force by driving the electric motor to rotate in the reverse direction when the back-up pressurization is being performed.

2. The vehicle brake device according to claim 1, wherein
the service brake includes brake fluid pressure adjustment means that has an automatic pressurization function that automatically increases the brake fluid pressure in the wheel cylinder, and
the pressurization means performs the back-up pressurization based on the automatic pressurization function of the brake fluid pressure adjustment means provided in the service brake.

3. The vehicle brake device according to claim 1, wherein
the pressurization means uses a notification device to perform notification of the release impossible state when the release impossible state is determined by the release impossible determination means, and thus causes a driver to operate the service brake and to perform the back-up pressurization.

4. The vehicle brake device according to claim 1, wherein
the release control means includes
drive stop means for stopping the supply of the motor current to the electric motor when the release impossible state is determined by the release impossible determination means, and
re-drive means for once more performing the supply of the motor current to the electric motor that has been stopped by the drive stop means, when the back-up pressurization is performed, and for driving the electric motor to rotate in the reverse direction.

5. The vehicle brake device according to claim 1, wherein
the electronic control means includes lock control means
for performing lock control that generates the parking
brake force by driving the electric motor to rotate in the
forward direction and causing the electric parking brake
to perform a lock operation, and
the pressurization means generates, as the back-up pressurization, at least a brake fluid pressure that corresponds to a difference between a motor current value at the end of previous lock control performed before the release control and a value of the locked rotor current.

* * * * *